(12) United States Patent
Bodet et al.

(10) Patent No.: US 9,346,334 B2
(45) Date of Patent: May 24, 2016

(54) AIR SUPPLY DEVICE FOR A VEHICLE HAVING PNEUMATIC DEVICES

(75) Inventors: Marc-Michel Bodet, Northen (DE); Uwe Stabenow, Laatzen (DE)

(73) Assignee: WABCO GmbH, Hannover (DE)

( * ) Notice: Subject to any disclaimer, the term of this patent is extended or adjusted under 35 U.S.C. 154(b) by 456 days.

(21) Appl. No.: 13/643,345

(22) PCT Filed: Mar. 10, 2011

(86) PCT No.: PCT/EP2011/001173
§ 371 (c)(1),
(2), (4) Date: Oct. 25, 2012

(87) PCT Pub. No.: WO2011/160735
PCT Pub. Date: Dec. 29, 2011

(65) Prior Publication Data
US 2013/0042932 A1 Feb. 21, 2013

(30) Foreign Application Priority Data
Jun. 24, 2010 (DE) .......................... 10 2010 024 889

(51) Int. Cl.
*F15B 13/04* (2006.01)
*B60G 17/04* (2006.01)
*B60G 17/052* (2006.01)

(52) U.S. Cl.
CPC ........ *B60G 17/0408* (2013.01); *B60G 17/0523* (2013.01); *B60G 2500/203* (2013.01); *B60G 2500/2012* (2013.01); *B60G 2600/66* (2013.01); *B60G 2600/68* (2013.01); *Y10T 137/794* (2015.04)

(58) Field of Classification Search
CPC .......................... B60T 17/004; B60G 17/0523
USPC .................................... 137/544; 280/124.161
See application file for complete search history.

(56) References Cited

U.S. PATENT DOCUMENTS

| 3,106,430 | A | * | 10/1963 | George ............................ 303/1 |
| 3,696,588 | A | * | 10/1972 | Dussourd et al. ............... 96/113 |
| 4,755,196 | A | * | 7/1988 | Frania et al. ..................... 96/116 |
| 4,764,189 | A | * | 8/1988 | Yanagawa et al. .............. 96/114 |
| 5,286,283 | A | * | 2/1994 | Goodell .......................... 96/113 |
| 5,622,544 | A | * | 4/1997 | Shamine et al. ................ 96/134 |
| 6,817,600 | B2 | | 11/2004 | Ocker et al. |
| 7,097,696 | B2 | * | 8/2006 | Salzman et al. ................ 96/121 |
| 2003/0080481 | A1 | | 5/2003 | Wang |
| 2003/0218281 | A1 | * | 11/2003 | Ocker et al. ............... 267/64.28 |
| 2004/0126247 | A1 | * | 7/2004 | Broser et al. .................. 417/312 |
| 2009/0079155 | A1 | | 3/2009 | Rehra et al. |

FOREIGN PATENT DOCUMENTS

| DE | 1 118 543 | 8/1960 |
| DE | 1 184 151 | 12/1964 |

(Continued)

*Primary Examiner* — John K Fristoe, Jr.
*Assistant Examiner* — Angelisa L Hicks
(74) *Attorney, Agent, or Firm* — Kramer Levin Naftalis & Frankel LLP

(57) ABSTRACT

An air supply device for a pneumatic spring system of a vehicle includes an air filter as a processor for incoming air, an inlet air line, an outlet air line, a compressor, and, optionally, an air drier. The inlet air line and the outlet air line are decoupled by a first and a second check valve, and the processor is arranged between the compressor and the first or second check valve.

12 Claims, 3 Drawing Sheets

(56) References Cited

FOREIGN PATENT DOCUMENTS

| | | |
|---|---|---|
| DE | 1 576 524 | 11/1966 |
| DE | 23 42 154 A1 | 2/1975 |
| DE | 30 31 631 A1 | 4/1982 |
| DE | 35 02 698 A1 | 7/1986 |
| DE | 41 34 115 A1 | 4/1993 |
| DE | 42 05 458 A1 | 8/1993 |
| DE | 197 37 701 A1 | 3/1999 |
| DE | 101 21 582 C2 | 11/2002 |
| DE | 103 57 762 A1 | 7/2003 |
| DE | 102 23 405 B4 | 12/2003 |
| DE | 102 40 357 A1 | 3/2004 |
| DE | 103 01 119 A1 | 7/2004 |
| DE | 10 2004 057 575 A1 | 6/2006 |
| DE | 10 2005 030 726 A1 | 1/2007 |
| DE | 10 2007 046 167 A1 | 4/2009 |
| DE | 10 2007 050 222 A1 | 4/2009 |
| DE | 10 2010 053 985 A1 | 6/2012 |
| EP | 1 306 239 B1 | 5/2003 |
| EP | 1 411 244 A2 | 4/2004 |
| EP | 1 479 584 A1 | 11/2004 |
| EP | 1 608 521 B1 | 12/2005 |
| EP | 1 901 934 B1 | 3/2008 |
| GB | 2 344 323 A | 6/2000 |
| WO | WO 2008/113549 A1 | 3/2008 |

\* cited by examiner

AIR SUPPLY DEVICE FOR A VEHICLE HAVING PNEUMATIC DEVICES

FIELD OF THE INVENTION

The present invention generally relates to an air supply device for a pneumatic spring in a vehicle, which comprises an air filter as a processor for incoming air, an inlet air line, an outlet air line, a compressor and, optionally, an air drier.

The invention further relates to a method of supplying a pneumatic spring system in a vehicle with compressed air.

BACKGROUND OF THE INVENTION

An air supply device for a pneumatic spring arrangement in a vehicle is described in EP 1 901 934 B1. This pneumatic spring arrangement has inlet and outlet air lines that are separate from one another. An air filter is arranged in the inlet air line and a silencer in the outlet air line.

A similar air supply device with a compressor and a silencer is shown in DE 101 21 582 C2 and EP 1 306 239 B1.

DE 102 23 405 84, DE 103 01 119 A1, EP 1 608 521 B1 and DE 10 2004 057 575 A1 show a pneumatic spring system or else an automatic level control for a vehicle, wherein the inlet air and the outlet air is conducted via a joint line. However, a joint line for intake air and discharge air has the disadvantage that air gives off moisture when discharged, which accumulates in the joint line. This moisture is then drawn in again.

Consequently, the air for compressed air generation is frequently drawn in at a place in the vehicle that differs from the place where the air is discharged (venting). This means that the inlet air and the outlet air must be conveyed to the compressor assembly or to the pneumatic spring system in separate lines. The reasons for using different locations are varied. When air is drawn in from the passenger space, for example, the inlet air is already comparatively dry, which reduces the drying required following compression. It has also proved favorable, however, for the inlet air to be removed right behind the vehicle radiator, for example. By contrast, the outlet air may be discharged anywhere on the vehicle. This often happens in direct proximity to the compressor assembly or the pneumatic spring.

SUMMARY OF THE INVENTION

Generally speaking, it is an object of the present invention to provide an air supply device for a pneumatic spring of a vehicle in a cost-effective manner.

A device is therefore provided according to an embodiment of the invention, in which a processor is disposed between the compressor and a first check valve and a second check valve. It is thereby possible for a joint processor for intake and discharge air to ensure, in conjunction with the first and second check valve, that the air can flow through separate intake and venting paths. In this case, the processor for the outgoing air is in the form of a silencer, and for the incoming air in the form of an air filter and silencer. Since silencers and air filters and silencers now no longer have to be fitted to the vehicle as separate components, one of these components can be dispensed with, resulting in a salutary reduction in manufacturing costs and installation space. At the same time the outlet air can clean the processor when it flows through it.

It is possible, moreover, for the path of the outlet air, once the air has flowed through the air drier operated in regeneration mode and is correspondingly charged with moisture, to be configured to be as short as possible within the joint lines for the inlet and outlet air. It is thereby possible to prevent the moisture from the outlet air accumulating and being drawn in again. For this purpose, it is favorable for the inlet air line and the outlet air line to be connected to the processor in a joint branch line. Between the branch line and the atmosphere the inlet air line is longer than the outlet air line by at least a factor of 2. The outlet air line is designed to be as short as structurally possible and is usually 15 centimeters long, but no longer than 30 centimeters.

It is advantageous that the second check valve provided in the outlet air line prevents water from penetrating the outlet air line. It is thereby possible for the outlet of the outlet air line, the second check valve and/or the processor to be disposed in the region of the vehicle's fording depth.

For the silencer and air filter function, it is favorable for the processor to be made from a porous foam material, for example. During the filtration process, this foam material adsorbs all particles with a size greater than 10 micrometers in an air volume flow of 20 to 50 liters per minute, wherein the differential pressure is smaller than or equal to 0.02 bar with a minimal air volume flow. When blowing out, the outlet air flows through the foam material of the processor in the opposite direction with a volume flow of up to 300 liters per minute.

It is furthermore advantageous for the processor and the first and second check valve to be formed in a joint housing as a module. It is thereby possible for the requirement for the shortest possible joint line paths to be realized in an optimal manner. Since the module has a low volume, no moisture can accumulate therein. The module can have a volume of about 150 to 200 cubic centimeters.

To simplify the assembly and avoid further sealing points in the vehicle, it is advantageous for the compressor and the air drier to be designed as an assembly that has a joint connection for the inlet air line and the outlet air line. It is thereby possible for the processor and the first and second check valve, which are combined in a module, to be connected quickly and easily to the compressor and the actual air drier.

It is also advantageous that the compressor and the air drier are designed as an assembly with the processor or the module. It is thereby possible for all functionally essential components of the compressed air production to be prefabricated in the smallest installation space in a highly integrative manner for quick and easy assembly in the vehicle. The smaller number of interfaces increases the quality and durability of the air supply device.

A method according to an embodiment of the invention includes supplying a pneumatic spring in a vehicle with compressed air, the air supplied to the pneumatic spring being drawn in via an inlet air line, fed to a processor acting as an air filter, subsequently compressed by a compressor and finally dehumidified in an air drier. Air discharged from the pneumatic spring first flows through the air drier, which can be operated in regeneration mode, then bypasses the compressor by means of a bypass and is released into the environment through the processor acting as a silencer via a second check valve in the outlet air line.

The transportation of the inlet air from the atmosphere to the compressor, including the filtration taking place in the processor, accompanies the process whereby the compressor produces a vacuum, which causes the first check valve disposed in the inlet air line to open and the second check valve disposed in the outlet air line to close through the spring load and the vacuum.

To release the compressed air, the outlet air from the pneumatic spring is conducted via the bypass to bypass the compressor, after which the outlet air flows through the processor, the first check valve disposed in the inlet air line is closed by the pressure of the outlet air and the spring load and the second check valve arranged in the outlet air line is opened by the pressure of the outlet air.

Still other objects and advantages of the present invention will in part be obvious and will in part be apparent from the specification.

The present invention accordingly comprises the features of construction, combination of elements, arrangement of parts, and the various steps and the relation of one or more of such steps with respect to each of the others, all as exemplified in the constructions herein set forth, and the scope of the invention will be indicated in the claims.

BRIEF DESCRIPTION OF THE DRAWINGS

The invention is described in greater detail below with reference to exemplary embodiments set forth in the appended drawing figures, in which.

DETAILED DESCRIPTION OF THE PREFERRED EMBODIMENTS

Figure 1:
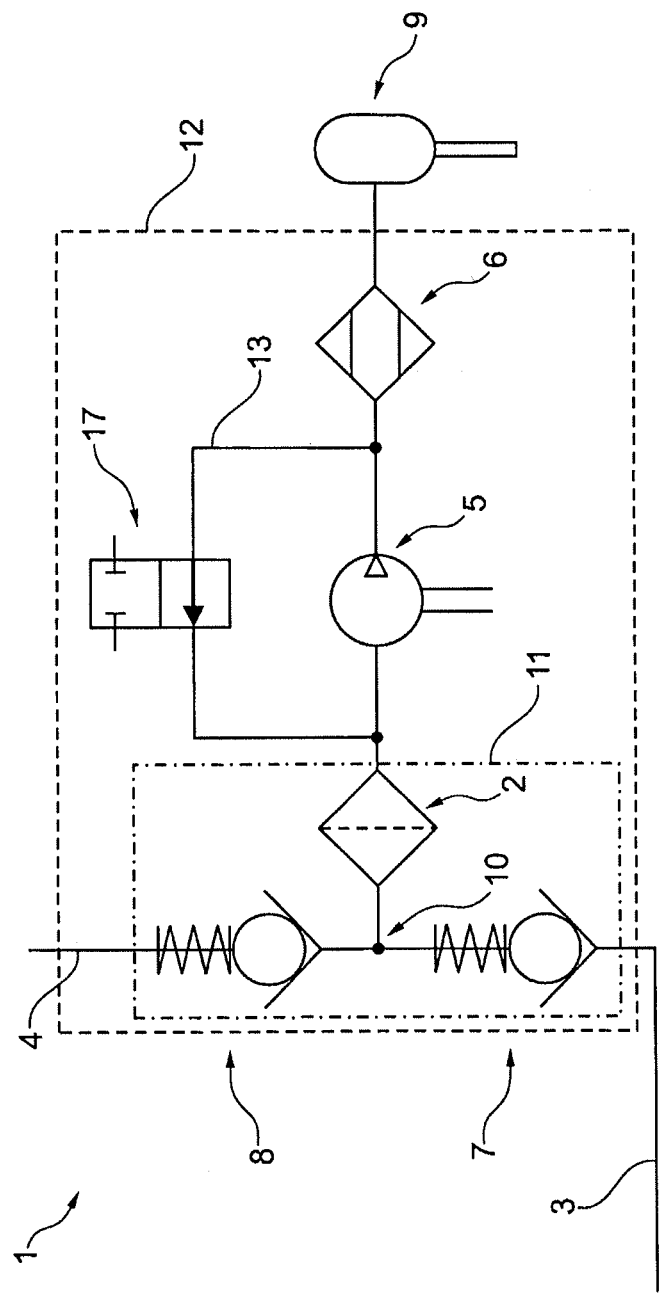
FIG. 1 is a connection diagram of an air supply device according to an embodiment of the present invention.

FIG. 1 shows an air supply device 1 for a pneumatic spring system 9 of a vehicle. The air supply device 1 comprises a processor 2, which filters the air flowing in through an inlet air line 3. Furthermore, the air supply device 1 comprises an outlet air line 4, a compressor 5 and, optionally, an air drier 6. The inlet air line 3 and the outlet air line 4 are decoupled from one another by a first check valve 7 and a second check valve 8. The processor 2 is arranged between the compressor 5 and the first check valve 7 and the second check valve 8. The inlet air line 3 and the outlet air line 4 are connected to the processor 2 in a joint branch line 10.

To transport the inlet air from atmosphere to the pneumatic spring system 9, the inlet air is drawn from the compressor 5 and dried in the air drier 6. Before the inlet air reaches the compressor 5, it is filtered in the processor 2. The first check valve 7 disposed in the inlet air line 3 is opened by the vacuum produced by the compressor 5, and the second check valve 8 disposed in the outlet air line 4 is closed by the spring load and the vacuum. When the compressed air located in the pneumatic spring 9 relaxes, it flows through the air drier 6 and regenerates it. To bypass the compressor 5, the outlet air is conducted through the bypass 13. A controllable valve 17 is located in the bypass 13, the valve being open only during venting. The outlet air flows thereafter through the processor 2. The first check valve 7 disposed in the inlet air line 3 is closed by the pressure of the outlet air and the spring load and the second check valve 8 disposed in the outlet air line 4 is opened by the pressure of the outlet air.

In a variant of the embodiment shown, the processor [[5]]2 and the first and second check valve 7, 8 are formed in a joint housing 14 as a module 11. The compressor 5 and the air drier 6 are designed with the module 11 as an assembly 12.

Figure 2:
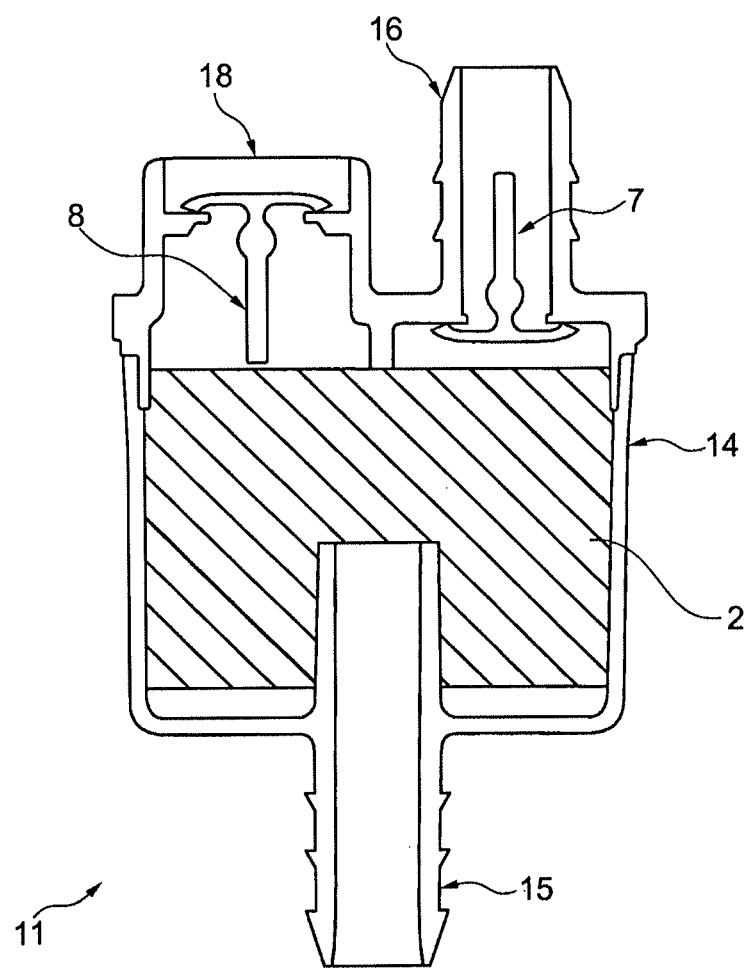
FIG. 2 is a sectional representation of a module with a processor and the first and second check valve of the air supply device shown in FIG. 1.

FIG. 2 shows the module 11 described in FIG. 1 in a sectional representation. The first and second check valves 7, 8 and the processor 2 are located in a joint housing 14 of the module 11. The housing 14 has a connection 16 for an inlet air line and a further connection 15 for a line to the compressor or the assembly. A vent line may be optionally connected to the vent port 18.

Figure 3:
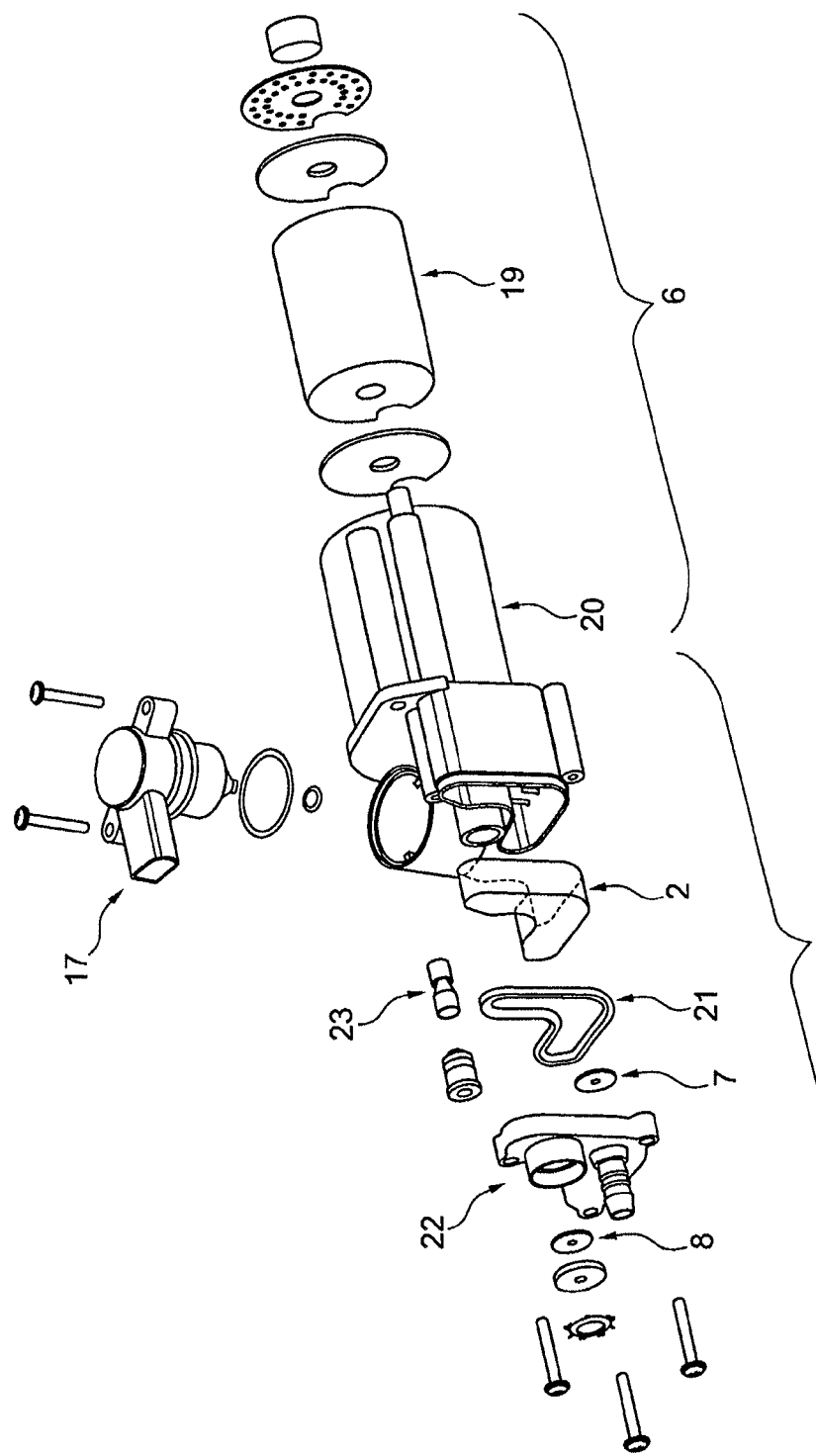
FIG. 3 is an exploded view of an assembly of the air supply device shown in FIG. 1.

FIG. 3 shows the assembly 12 described in FIG. 1, consisting of the air drier 6, the module 11 and the compressor 5, which is not shown here, a housing 20 with a sealing cap 22, which includes a drier 19 of the air drier 6, the processor 2, the valve 17, a throttle 21 and the first and second check valves 7, 8.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. An air supply device for a pneumatic spring system of a vehicle, the device comprising an air processor, an inlet air line, an outlet air line, and a compressor, the inlet air line and the outlet air line being decoupled from one another by a first check valve and a second check valve, the processor being arranged between the compressor and the first and second check valves, the first check valve being disposed such that it passes air from the inlet air line to the compressor when the compressor is activated, and the second check valve being disposed such that it passes air from the processor to the outlet air line during venting.

2. The air supply device according to claim 1, wherein the inlet air line and the outlet air line are connected to the processor in a joint branch line.

3. The air supply device according to claim 1, wherein the processor is a silencer for outgoing air.

4. The air supply device according to claim 1, wherein the processor is made from a foam material.

5. The air supply device according to claim 1, wherein the compressor and an air drier form an assembly.

6. The air supply device according to claim 5, wherein the assembly includes a joint connection for the inlet air line and the outlet air line.

7. The air supply device according to claim 1, wherein the processor and the first and second check valves are formed in a joint housing as a module.

8. The air supply device according to claim 7, wherein the compressor and an air drier are included with one of the processor and the module as an assembly.

9. The air supply device according to claim 1, wherein the first and second check valves are loaded with a closing force.

10. A method of supplying a pneumatic spring of a vehicle with compressed air, the method comprising drawing in air to be supplied to the pneumatic spring via an inlet air line; feeding the air to a processor acting as at least one of an air filter and a silencer through a first check valve; compressing the fed air using a compressor; dehumidifying the compressed air in an air drier; passing the dehumidified air to be discharged from the pneumatic spring first through the air drier, then through the processor acting as a silencer via a bypass bypassing the compressor, and then into the environment via a second check valve and an outlet air line.

11. The air supply device as claimed in claim 1, wherein the processor is an air filter for incoming air.

12. The air supply device as claimed in claim 1, wherein an input end of the processor is coupled to both an output end of the first check valve and an input end of the second check valve, and wherein an output end of the processor is coupled to the compressor.

* * * * *